(12) United States Patent
Migdalovich et al.

(10) Patent No.: US 9,332,076 B2
(45) Date of Patent: May 3, 2016

(54) METHOD AND APPARATUS FOR SETTING A LANGUAGE OF A REMOTE DEVICE

(71) Applicant: Xerox Corporation, Norwalk, CT (US)

(72) Inventors: Yelena Migdalovich, Rochester, NY (US); Giuseppe Pandolfo, Rochester, NY (US); Jason McGoff, Rochester, NY (US); Paul Roberts Conlon, South Bristol, NY (US); Timothy Luke Dioguardi, Rochester, NY (US)

(73) Assignee: Xerox Corporation, Norwalk, CT (US)

( * ) Notice: Subject to any disclaimer, the term of this patent is extended or adjusted under 35 U.S.C. 154(b) by 0 days.

(21) Appl. No.: 14/495,293

(22) Filed: Sep. 24, 2014

(65) Prior Publication Data

US 2016/0088089 A1    Mar. 24, 2016

(51) Int. Cl.
  *H04W 4/02* (2009.01)
  *H04L 29/08* (2006.01)
  *G06Q 30/02* (2012.01)
  *H04W 4/00* (2009.01)
  *H04L 12/24* (2006.01)

(52) U.S. Cl.
  CPC .......... *H04L 67/125* (2013.01); *G06Q 30/0277* (2013.01); *H04L 41/0293* (2013.01); *H04L 67/18* (2013.01); *H04W 4/008* (2013.01)

(58) Field of Classification Search
  None
  See application file for complete search history.

(56) References Cited

U.S. PATENT DOCUMENTS

| | | | | |
|---|---|---|---|---|
| 7,644,039 | B1* | 1/2010 | Magee | G06Q 20/1085 221/9 |
| 9,123,037 | B2* | 9/2015 | Dismukes | G06Q 20/204 |
| 2003/0057271 | A1* | 3/2003 | Andersen | G06Q 20/341 235/379 |
| 2009/0138255 | A1* | 5/2009 | Sterling | G06Q 20/10 704/2 |
| 2011/0173535 | A1* | 7/2011 | Royal, Jr. | G07F 9/023 715/703 |
| 2011/0184865 | A1* | 7/2011 | Mon | G06Q 20/1085 705/43 |
| 2012/0311019 | A1* | 12/2012 | Raman | G06Q 20/3278 709/203 |
| 2013/0124186 | A1* | 5/2013 | Donabedian | G06F 17/289 704/2 |
| 2014/0180671 | A1* | 6/2014 | Osipova | G06F 17/275 704/8 |

* cited by examiner

*Primary Examiner* — Kimberly A Williams

(57) ABSTRACT

A method, non-transitory computer readable medium, and apparatus for setting a language of a remote device are disclosed. For example, the method determines connectivity information for interacting with the remote device, assesses a language setting of the mobile endpoint device, and sets the language of the remote device by sending the language setting of the mobile endpoint device to the remote device using the connectivity information.

16 Claims, 5 Drawing Sheets

METHOD AND APPARATUS FOR SETTING A LANGUAGE OF A REMOTE DEVICE

The present disclosure relates generally to the control of remote devices, e.g., networked devices and, more particularly, to a method and apparatus for setting a language of a remote device.

BACKGROUND

Travelers often encounter remote devices that provide user interfaces with different foreign languages. For example, a traveler may encounter a printer or a copier at a business center located in an airport lounge, e.g., owned by a particular airline. Such lounge may offer various business services such as private meeting rooms, phone services, wireless and Internet access, printing services, document copying services, food services and the like. It is often the case that remote devices such as printers, copiers, food or beverage dispensing machines, and the like, have user interfaces that will present various features or functions of the remote devices in a particular foreign language, e.g., French if the airport lounge is located in France.

In another example, remote devices in other transit points such as train stations or bus stations may provide other services such as the automated printing of train tickets or bus tickets or information displays for showing the routes of various trains or buses. Unfortunately, these remote devices are also presented in a native language of the geographic location, e.g., French if the ticket machine is located in the subway system of Paris.

If the travelers are not familiar with the native foreign language presented by these remote devices, the travelers will be frustrated by the difficulty of interacting with these remote devices due purely to the language barrier. Thus, the very convenience provided by these remote devices cannot be enjoyed by the travelers.

SUMMARY

According to aspects illustrated herein, there are provided a method, a non-transitory computer readable medium, and an apparatus for setting a language of a remote device. One disclosed feature of the embodiments is a method that determines connectivity information for interacting with the remote device, assesses a language setting of the mobile endpoint device, and sets the language of the remote device by sending the language setting of the mobile endpoint device to the remote device using the connectivity information.

Another disclosed feature of the embodiments is a non-transitory computer-readable medium having stored thereon a plurality of instructions, the plurality of instructions including instructions which, when executed by a processor, cause the processor to perform operations that determine connectivity information for interacting with the remote device, assess a language setting of the mobile endpoint device, and set the language of the remote device by sending the language setting of the mobile endpoint device to the remote device using the connectivity information.

Another disclosed feature of the embodiments is an apparatus comprising a processor and a computer readable medium storing a plurality of instructions which, when executed by the processor, cause the processor to perform operations that determine connectivity information for interacting with the remote device, assess a language setting of the mobile endpoint device, and set the language of the remote device by sending the language setting of the mobile endpoint device to the remote device using the connectivity information.

BRIEF DESCRIPTION OF THE DRAWINGS

The teaching of the present disclosure can be readily understood by considering the following detailed description in conjunction with the accompanying drawings, in which.

To facilitate understanding, identical reference numerals have been used, where possible, to designate identical elements that are common to the figures.

DETAILED DESCRIPTION

The present disclosure broadly discloses a method, apparatus and non-transitory computer-readable medium for setting a language (broadly a human language) of a remote device. As discussed above, travelers often encounter remote devices that provide user interfaces with different foreign languages, e.g., English, French, Spanish, Italian, German, Portuguese, Russian, Chinese, Japanese, Korean, Vietnamese, Arabic, and the like.

For example, a traveler may encounter a remote device, e.g., a printer, a copier, a scanner, a transit ticket machine, a kiosk, an automated teller machine (ATM), or a food or beverage dispensing machine, in a foreign country that is not native to the traveler. It is often the case that such remote devices have user interfaces that will present various features or functions of the remote devices in a particular native human language. If the traveler is not familiar with the native "foreign" human language presented by these remote devices, the traveler will be quickly frustrated by the difficulty of interacting with these remote devices due purely to the language barrier.

It should be noted that the present disclosure is not limited to any particular human language. As such, any reference to a particular language in this disclosure is only illustrative and should not be interpreted as a limitation of the present disclosure. Furthermore, it should be noted that the present disclosure may use the following terms, e.g., language, human language, foreign language, native language, interchangeably.

One embodiment of the present disclosure addresses this problem by providing a system and architecture that allow an endpoint device, e.g., a mobile endpoint device, to dynamically set a foreign language on a remote device. For example, mobile endpoint devices may use one or more mobile applications to communicate and send commands to remote devices, e.g., networked devices such as scanners, printers, copiers, multi-function devices (MFDs), ticket dispensing machines, kiosks, ATMs, and the like. It should be noted that although the present disclosure describes the remote devices as "networked devices", i.e., hardware devices or machines having the capability to communicate with a network, e.g., a local area network (LAN), a wide area network (WAN) or the Internet, the present disclosure may be applied to non-network devices (broadly a standalone device that can interact with other devices via direct machine to machine communication) in an alternate embodiment as discussed below.

In one embodiment, the mobile endpoint devices may issue one or more commands to a remote device to dynamically select a different foreign language to be displayed on a user interface of the remote device. For example, if the remote device is displaying French on the user interface, a traveler using a mobile endpoint device may send a command to the remote device to dynamically present English on the user interface.

Figure 1:
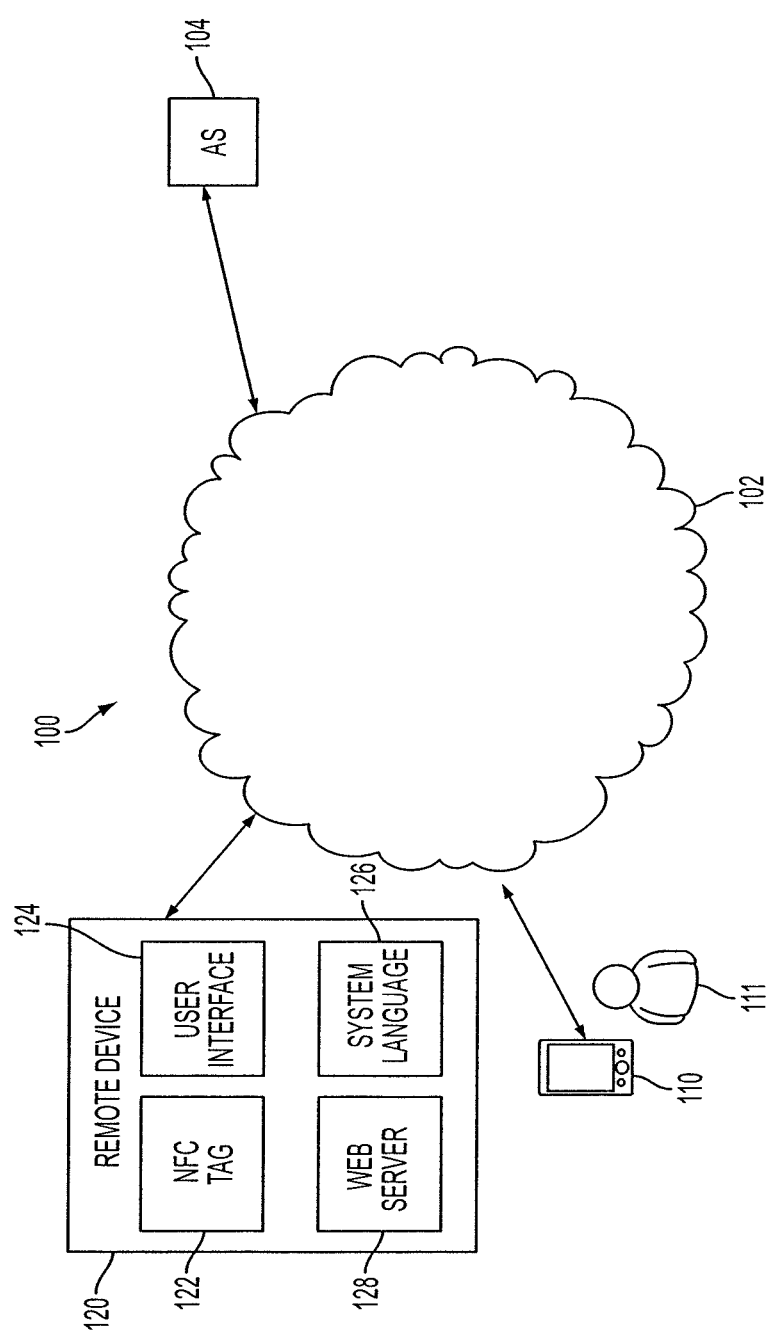
FIG. 1 illustrates an example block diagram of a system of the present disclosure.

FIG. 1 illustrates an example system 100 of the present disclosure. The system 100 may include a network 102. In one embodiment, the network 102 may be a local network of a company or commercial enterprise. In another embodiment, the network 102 may be a network in the "cloud" or accessible over the Internet.

It should be noted that the network 102 is simplified for ease of explanation. The network 102 may include additional access networks or network elements (e.g., firewalls, border elements, gateways, application servers, and the like) that are not shown.

In one embodiment, a user (e.g., a traveler) 111 is carrying a mobile endpoint device 110. The user may be interested in using the services provided by a remote device 120. In one embodiment, the remote device is a networked device that is capable of interacting with the network 102 over a wireless or wired connection. In one embodiment, the networked device 120 may be a printer, a copier, a scanner, a transit ticket machine, a kiosk, an automated teller machine (ATM), or a food or beverage dispensing machine, and the like. In one example, the networked device 120 may broadcast its location (e.g., Global Positioning System (GPS) coordinates and the like) and its capabilities including the language switching capability as further discussed below.

In one embodiment, the endpoint device 110 may be any type of endpoint device that is attempting to issue a command to the networked device 120 to set a foreign language for the user interface of the networked device. The endpoint device 110 may include, for example, a mobile endpoint device (e.g., a smartphone, a cellular telephone, a laptop computer, a tablet computer, a watch, a pair of eye glasses and the like).

In one embodiment, the networked device 120 may be using a native language setting, e.g., French in a geographic location within France. However, the endpoint device 110 may be operating on a different language setting, e.g., English. In other words, the user 111 prefers to use English in the operation of the endpoint device 110. As a result, if the traveler 111 does not understand French, then the traveler 111 will have great difficulty in operating the remote device to gain the benefits of the services provided by the remote device 120.

However, one embodiment of the present disclosure provides a system 100 where the remote device 120 is able to interact with the mobile endpoint device 110 to allow a language setting on the remote device 120 to be dynamically changed. In one embodiment, the remote device 120 comprises a near field communication (NFC) tag 122, a user interface 124 (e.g., one or more displays), a system language module 126 (e.g., a storage medium containing one of more language libraries), and a web server 128 (e.g., one or more software applications, interfaces and/or hardware components (e.g., transceivers) to interact with a network).

In one embodiment, the endpoint device 110 may initiate a connection with the networked device 120. For example, the mobile endpoint device 110 may scan a near field communication (NFC) tag 122 using a "tap to change language" feature of the networked device 120. Namely, the user 111 may approach the networked device 120 and gently tap or bump the NFC tag 122 coupled to the networked device 120. In turn, the information (e.g., instructions, commands, connectivity information and the like) stored on the NFC tag will be read or scanned by the mobile endpoint device 110.

In another embodiment, the endpoint device 110 may simply attempt to connect to the networked device 120 over a wireless connection. For example, the networked device 120 may wirelessly broadcast its available services over a localized geographic area. For example, the networked device 120 (e.g., a ticket dispensing machine) may broadcast its location and services to users within a train terminal. The user's mobile endpoint device when within communication range of the ticket dispensing machine, will simply be notified of the services and features offered by the ticket dispensing machine. In one embodiment, the ticket dispensing machine may offer an application (e.g., an applet) to be downloaded to the user's mobile endpoint device for utilizing a language change feature of the present disclosure.

When the mobile endpoint device 110 connects to the networked device 120 (either directly or via a communication network 102), the mobile endpoint device 110 may display a user interface (UI) to the user. The UI may be a graphical user interface that includes commands or instructions that are associated with the networked device 120. In one example, a list of supported foreign languages will be presented to the user for selection. In another example, the software application within the mobile endpoint device 110 may simply determine the language setting of the mobile endpoint device and instruct the remote device to select a language that is consistent with the language setting of the mobile endpoint device. For example, if the language setting of the mobile endpoint device is English, then the software application will instruct the remote device to use English in its user interface. Similarly, if the language setting of the mobile endpoint device is German, then the software application will instruct the remote device to use German in its user interface.

In one embodiment, the language setting of the mobile endpoint device may comprise a list of languages. For example, a traveler may be multi-lingual where the traveler may be fluent in a number of languages. As such, the language setting of the mobile endpoint device may comprise a list, e.g., 1) French, followed by 2) English, followed by 3) Italian, and so on. This will allow greater flexibility in matching a language that is supported by both the remote device and the mobile endpoint device.

In one embodiment, the mobile endpoint device 110 may be equipped with any type of short range communications protocol or personal area network (PAN) communications protocols, such as for example, near field communications (NFC) technology, Bluetooth®, Zigbee®, Wifi-Direct and the like. However, the present disclosure is not limited to any particular type of short range communications protocol.

In one embodiment, additional support, features or services can be obtained from an application server (AS) 104 via the network 102. For example, if there is an update to the list of supported foreign languages or new features, the AS 104 may upload any updates or new features to one or more remote devices 120.

Figure 2:
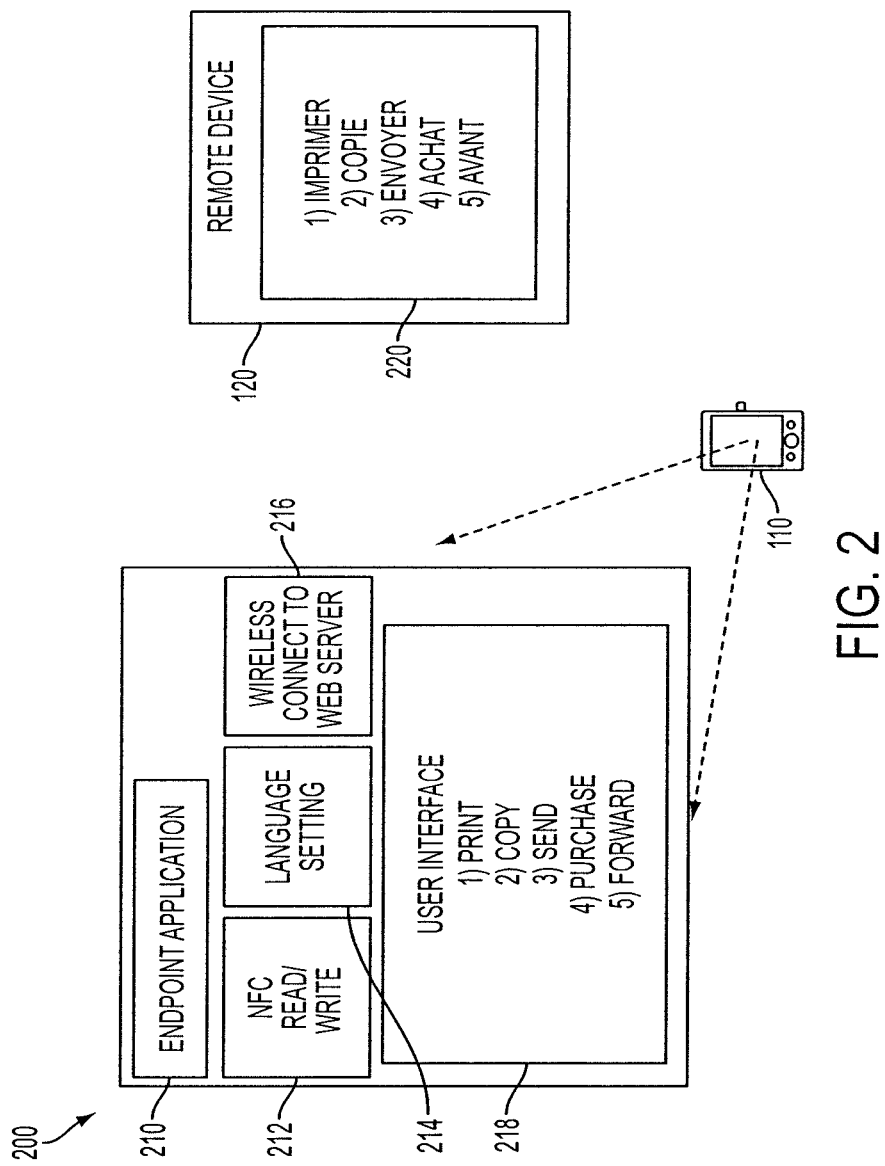
FIG. 2 illustrates an example block diagram of an endpoint device and a remote device of the present disclosure.

FIG. 2 illustrates an example block diagram of an endpoint device 110 and a remote device 120 of the present disclosure. The endpoint device 110 may comprise an endpoint application 210, an NFC read/write module 212, a language setting module 214 (e.g., a storage medium storing a language preference), a wireless connect web server 216 (e.g., one or more software applications, interfaces and/or hardware components (e.g., transceivers) to interact with a network) and a user interface 218 (e.g., one or more displays).

In one embodiment, after the NFC tag is tapped the endpoint application 210 will scan the information (e.g., instructions, commands, connectivity information, and the like) stored by the NFC tag. For example, the connectivity information will provide the necessary contact information (e.g., a Uniform Resource Locator (URL)) for a web service hosted on the remote device 120. The endpoint application 210 will read the language setting from the language setting module 214 of the mobile endpoint device and then calls the remote language setting web service with the preferred language to be set on the remote device.

It should be noted that the NFC tag 122 can be passive or active. Passive NFC tags generally contain stored information that can be scanned, but such passive NFC tags will not have the capability to directly engage in active two-way communication with the mobile endpoint device. For example, the passive NFC tag can be implemented as a sticker with passive components attached to the remote device. Alternatively, the NFC tag 122 can be implemented as an active NFC tag that is integrated with the electronics of the remote device. In other words, such active NFC tags will have the capability to directly engage in active two-way communication with the mobile endpoint device. If active NFC tags are used, the mobile endpoint device 110 may communicate directly with the remote device 120 without using the network 102.

FIG. 2 also illustrates a user interface 218 that shows several possible commands that the user 111 may want to execute on the remote device 120. For example, commands such as: 1) print, 2) copy, 3) send, 4) purchase, and 5) forward, can be supported by the remote device 120. However, these same commands are illustrated in the user interface 220 as French, e.g., 1) imprimer, 2) copie, 3) envoyer, 4) achat, and 5) avant) on the remote device 120. If the user is not familiar with French, the user will have difficulty selecting the correct commands to access the desired features. Using the present methods as disclosed in the present disclosure, the French commands shown on the user interface of the remote device 120 will be dynamically converted to English.

Figure 3:
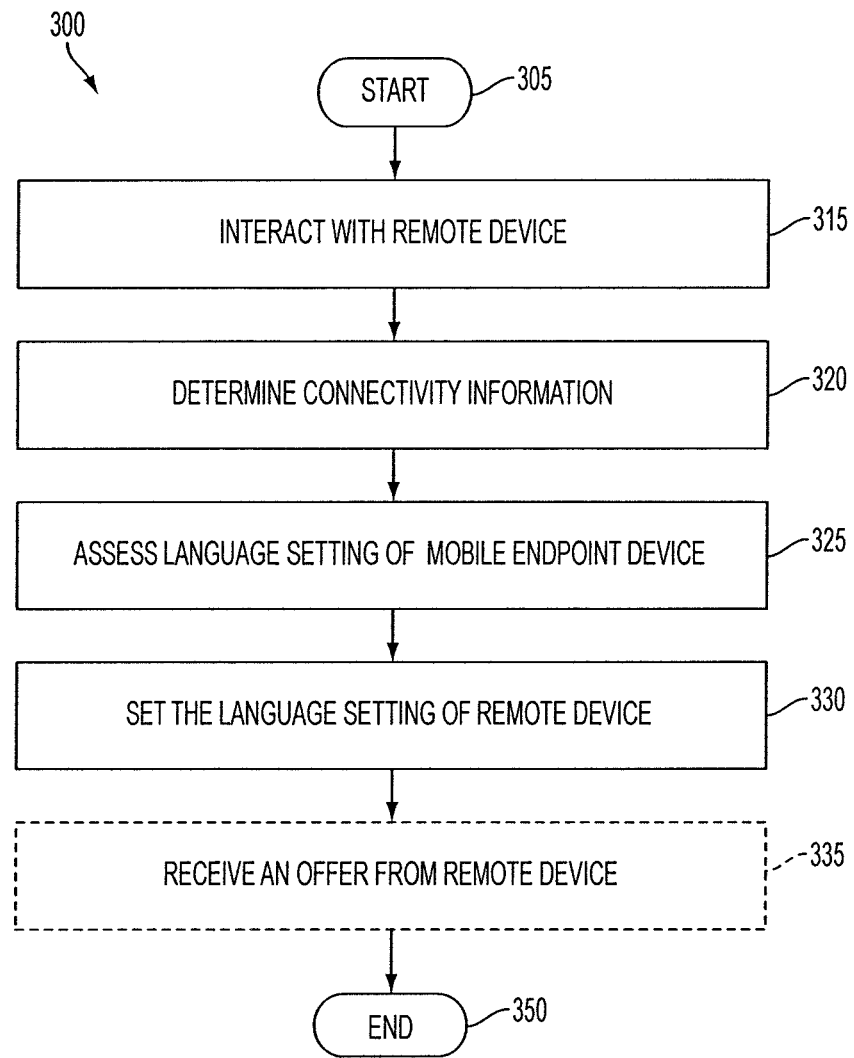
FIG. 3 illustrates an example flowchart of one embodiment of a method for setting a language of a remote device.
Figure 5:
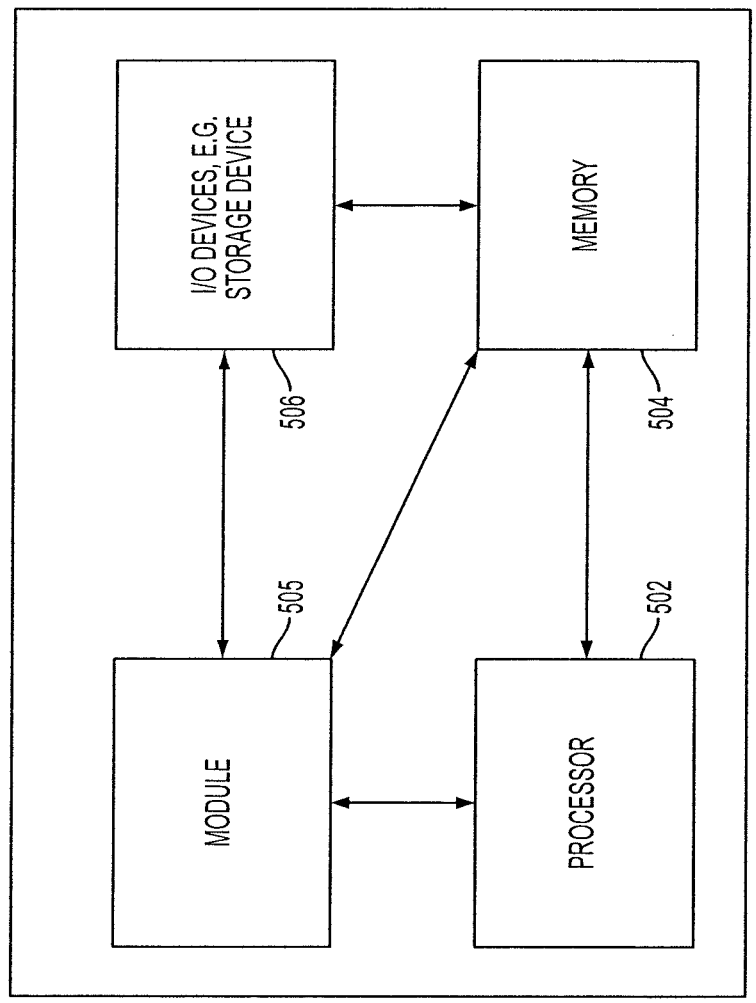
FIG. 5 illustrates a high-level block diagram of a general-purpose computer suitable for use in performing the functions described herein.

FIG. 3 illustrates an example flowchart of a method 300 for setting a language of a remote device. In one embodiment, one or more steps or operations of the method 300 may be performed by the mobile endpoint device 110 or a general-purpose computer as illustrated in FIG. 5 and discussed below.

At step 305 the method 300 begins. At step 315, the method 300 interacts with a remote device. The mobile endpoint device may initiate a connection to the remote device by scanning an NFC tag using a "tap to change a language" feature of the remote device. For example, method 300 detects an NFC tag and scans stored information (e.g., instructions, commands, and/or connectivity information) on the NFC tag. In another example, the method 300 receives a broadcast from the remote device 120, e.g., via a wireless connection. In one embodiment, the interaction in step 305 may include an optional step where an offer for downloading a software application of the present disclosure is presented to the mobile endpoint device. In other words, if the mobile endpoint device did not already have the software capability to select a language as disclosed in the present disclosure, then it can be downloaded on the fly when it is interacting with the remote device.

At step 320, the method 300 determines the connectivity information for reaching the remote device. For example, the method 300 may determine a URL for a web service hosted by the remote device. Alternatively, the method 300 may determine the type of near field communication protocol to use for interacting with the remote device directly.

At step 325, the method 300 assesses the language setting of the mobile endpoint device or a language preference of the user. For example, the native language used in the mobile endpoint device is determined, e.g., from language setting module 214. Alternatively, the remote device 120 may provide a list of foreign languages that are supported and allows the user to select one of the listed foreign languages.

At step 330, the method 300 sets the language setting of the remote device. For example, the method provides a command to the remote device to switch to a foreign language consistent with the language setting of the mobile endpoint device or a language preference of the user. As discussed above, if a list is presented, then the setting would select the language based on the preference or priority of the listed language, e.g., selecting a primary language versus a secondary language and the like. Furthermore, in one embodiment, the setting may select a language that is "preferred" by both the remote device and the mobile endpoint device. For example, this synchronizing of the "preferred" language may minimize context switching due to cognitive dissonance. This can be implemented as an option on the mobile endpoint device.

At optional step 335, the method 300 receives one or more offers from the remote device 120. For example, once the language setting has been dynamically set on the remote device 120, the remote device 120 may then communicate one or more offers to the mobile endpoint device 110 in the language that was selected by the endpoint device 110. For example, once the language setting has been dynamically set from French to English on the remote device 120, the remote device 120 may then present offers to the user in English. This will increase the likelihood that the user will understand the presented offers in a language that the user is familiar with. The offers may comprise an offer to purchase products or services at a discounted rate, an offer for group discounts, an offer to download a software application to gain access to more service features or functions of the remote device, and the like. In one embodiment, the offered products and/or services can be filtered by a user profile, e.g., stored on the mobile endpoint device. Since the offered products and/or services are now in the preferred language, the filtering using the user profile can be made more effective. At step 350, the method 300 ends.

Figure 4:
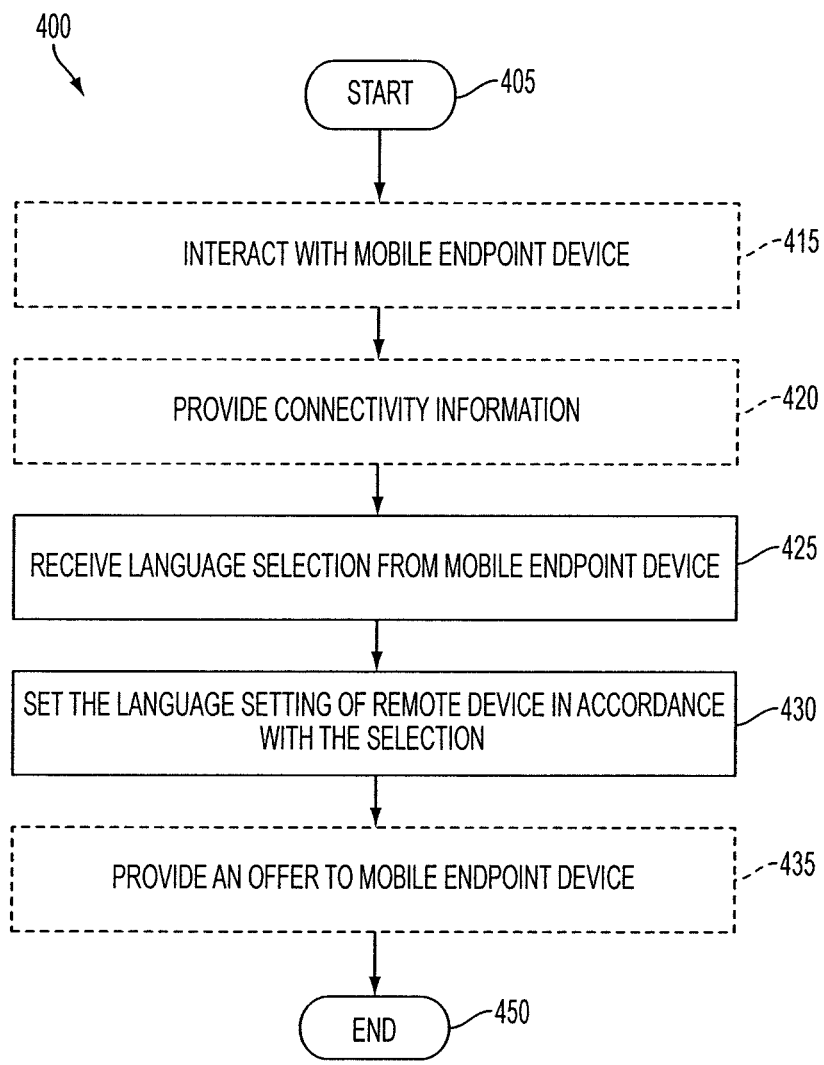
FIG. 4 illustrates another example flowchart of one embodiment of a method for setting a language of a remote device.

FIG. 4 illustrates an example flowchart of a method 400 for setting a language of a remote device. In one embodiment, one or more steps or operations of the method 400 may be performed by the remote device 120 or a general-purpose computer as illustrated in FIG. 5 and discussed below.

At step 405 the method 400 begins. At optional step 415, the method 400 interacts with an endpoint device, e.g., a mobile endpoint device. For example, the method 400 may continuously provide a broadcast to one or more mobile endpoint devices 110, e.g., via a wireless connection. However, the remote device 120 may employ a passive mechanism to interact with the mobile endpoint device without the need to engage in active communication to initiate the present process. For example, the mobile endpoint device 110 may initiate a connection to the remote device 120 by scanning an NFC tag using a "tap to change a language" feature of the remote device. For example, the mobile endpoint device detects an NFC tag and scans stored information (e.g., instructions, commands, and/or connectivity information) on the NFC tag. Thus, step 415 may be an optional step depending on the requirements of a particular deployment.

At optional step 420, the method 400 may provide the connectivity information (and a list of supported foreign languages in one embodiment) for reaching the remote device 120 to one or more mobile endpoint devices 110, e.g., via a wireless connection. For example, the method may actively broadcast connectivity information (and supported foreign languages) to mobile endpoint devices 110 within a particular localized geographic area. For example, the method may broadcast a URL for a web service hosted by the remote device or the type of near field communication protocol to use for interacting with the remote device 120 directly. However, as indicated above, this step may also be deemed an optional step if a passive NFC tag is employed. Namely, the connectivity information can be obtained passively through the NFC tag.

At step 425, the method 400 receives a language selection from the mobile endpoint device. For example, the method 400 receives a command from the mobile endpoint device to switch to a foreign language consistent with the language setting of the mobile endpoint device or a language preference of the user. Alternatively, the method 400 may receive a language selection from the mobile endpoint device in response to a list of supported foreign languages sent by the remote device 120.

At step 430, the method 400 sets the language setting of the remote device in accordance with the language selection received from the mobile endpoint device. For example, if a command from the mobile endpoint device is received to change the current language setting to English from another foreign language, the remote device will change the current language setting to English.

At optional step 435, the method 400 sends one or more offers from the remote device 120 to the mobile endpoint device. For example, once the language setting has been dynamically set on the remote device 120, the remote device 120 may then communicate one or more offers to the mobile endpoint device 110 in the language that was selected by the endpoint device 110. For example, once the language setting has been dynamically set from French to English on the remote device 120, the remote device 120 may then present offers to the user in English. This will increase the likelihood that the user will understand the presented offers in a language that the user is familiar with. The offers may comprise an offer to purchase products or services at a discounted rate, an offer for group discounts, an offer to download a software application to gain access to more service features or functions of the remote device, and the like. In one embodiment, once the transaction is completed, the method 400 may revert automatically back to the default language, e.g., French in this example. At step 450, the method 400 ends.

It should be noted that although not explicitly specified, one or more steps, functions, or operations of the methods 300 and 400 described above may include a storing, displaying and/or outputting step as required for a particular application. In other words, any data, records, fields, and/or intermediate results discussed in the methods can be stored, displayed, and/or outputted to another device as required for a particular application. Furthermore, steps, functions, or operations in FIGS. 3 and 4 that recite a determining operation, or involve a decision, do not necessarily require that both branches of the determining operation be practiced. In other words, one of the branches of the determining operation can be deemed as an optional step. In addition, it should be noted that FIGS. 3 and 4 in some embodiments may be performed using any combination of the steps (e.g., using fewer than all of the steps) illustrated in FIGS. 3 and 4 or in an order that varies from the order of the steps illustrated in FIGS. 3 and 4.

FIG. 5 depicts a high-level block diagram of a general-purpose computer suitable for use in performing the functions described herein. As depicted in FIG. 5, the system 500 comprises one or more hardware processor elements 502 (e.g., a central processing unit (CPU), a microprocessor, or a multi-core processor), a memory 504, e.g., random access memory (RAM) and/or read only memory (ROM), a module 505 for setting a language of a remote device, and various input/output devices 506 (e.g., storage devices, including but not limited to, a tape drive, a floppy drive, a hard disk drive or a compact disk drive, a receiver, a transmitter, a speaker, a display, a speech synthesizer, an output port, an input port and a user input device (such as a keyboard, a keypad, a mouse, a microphone and the like)). Although only one processor element is shown, it should be noted that the general-purpose computer may employ a plurality of processor elements. Furthermore, although only one general-purpose computer is shown in the figure, if the method(s) as discussed above is implemented in a distributed or parallel manner for a particular illustrative example, i.e., the steps of the above method(s) or the entire method(s) are implemented across multiple or parallel general-purpose computers, then the general-purpose computer of this figure is intended to represent each of those multiple general-purpose computers. Furthermore, one or more hardware processors can be utilized in supporting a virtualized or shared computing environment. The virtualized computing environment may support one or more virtual machines representing computers, servers, or other computing devices. In such virtualized virtual machines, hardware components such as hardware processors and computer-readable storage devices may be virtualized or logically represented.

It should be noted that the present disclosure can be implemented in software and/or in a combination of software and hardware, e.g., using application specific integrated circuits (ASIC), a programmable logic array (PLA), including a field-programmable gate array (FPGA), or a state machine deployed on a hardware device, a general purpose computer or any other hardware equivalents, e.g., computer readable instructions pertaining to the method(s) discussed above can be used to configure a hardware processor to perform the steps, functions and/or operations of the above disclosed methods. In one embodiment, instructions and data for the present module or process 505 for setting a language of a remote device (e.g., a software program comprising computer-executable instructions) can be loaded into memory 504 and executed by hardware processor element 502 to implement the steps, functions or operations as discussed above in connection with the exemplary methods 300 and 400. Furthermore, when a hardware processor executes instructions to perform "operations", this could include the hardware processor performing the operations directly and/or facilitating, directing, or cooperating with another hardware device or component (e.g., a co-processor and the like) to perform the operations.

The processor executing the computer readable or software instructions relating to the above described method(s) can be perceived as a programmed processor or a specialized processor. As such, the present module 505 for setting a language of a remote device (including associated data structures) of the present disclosure can be stored on a tangible or physical (broadly non-transitory) computer-readable storage device or medium, e.g., volatile memory, non-volatile memory, ROM memory, RAM memory, magnetic or optical drive, device or diskette and the like. More specifically, the computer-readable storage device may comprise any physical devices that provide the ability to store information such as data and/or instructions to be accessed by a processor or a computing device such as a computer or an application server.

It will be appreciated that variants of the above-disclosed and other features and functions, or alternatives thereof, may be combined into many other different systems or applications. Various presently unforeseen or unanticipated alternatives, modifications, variations, or improvements therein may be subsequently made by those skilled in the art which are also intended to be encompassed by the following claims.

What is claimed is:

1. A method for setting a language of a remote device, comprising:
    determining, by a processor of a mobile endpoint device, connectivity information for interacting with the remote device;
    assessing, by the processor, a language setting of the mobile endpoint device;
    detecting, by the processor, that a software application to interact with the remote device is not available on the mobile endpoint device;
    receiving, by the processor, an offer from the remote device to download the software application to interact with the remote device;
    downloading, by the processor, the software application to interact with the remote device; and
    setting, by the processor, the language of the remote device by sending the language setting of the mobile endpoint device to the remote device using the connectivity information via the software application.

2. The method of claim 1, wherein the remote device is a networked device.

3. The method of claim 1, wherein the remote device is a non-networked device.

4. The method of claim 1, wherein the remote device comprises a printer, a copier, a scanner, a ticket machine, a kiosk, an automated teller machine (ATM), a food dispensing machine or a beverage dispensing machine.

5. The method of claim 1, wherein the offer also comprises an offer to purchase a product or a service.

6. The method of claim 1, wherein the connectivity information is determined via a near field communication tag.

7. The method of claim 6, wherein the near field communication tag comprises a passive near field communication tag.

8. The method of claim 6, wherein the near field communication tag comprises an active near field communication tag.

9. The method of claim 1, wherein the connectivity information comprises a uniform resource locator (URL)) for a web service hosted on the remote device.

10. A non-transitory computer-readable medium storing a plurality of instructions, which when executed by a processor of a mobile endpoint device, cause the processor to perform operations for setting a language of a remote device, the operations comprising:
    determining connectivity information for interacting with the remote device;
    assessing a language setting of the mobile endpoint device;
    detecting that a software application to interact with the remote device is not available on the mobile endpoint device;
    receiving an offer from the remote device to download the software application to interact with the remote device;
    downloading the software application to interact with the remote device; and
    setting the language of the remote device by sending the language setting of the mobile endpoint device to the remote device using the connectivity information via the software application.

11. The non-transitory computer-readable medium of claim 10, wherein the remote device is a networked device.

12. The non-transitory computer-readable medium of claim 10, wherein the remote device comprises a printer, a copier, a scanner, a ticket machine, a kiosk, an automated teller machine (ATM), a food dispensing machine or a beverage dispensing machine.

13. The non-transitory computer-readable medium of claim 10, wherein the offer also comprises an offer to purchase a product or a service.

14. The non-transitory computer-readable medium of claim 10, wherein the connectivity information is determined via a near field communication tag.

15. A method for setting a language of a remote device, comprising:
    determining, by a processor of a mobile endpoint device, connectivity information via a passive near field communication tag for interacting with the remote device, wherein the remote device is a networked device, wherein the remote device comprises a printer, a copier, a scanner, a ticket machine, a kiosk, an automated teller machine (ATM), a food dispensing machine or a beverage dispensing machine;
    assessing, by the processor, a language setting of the mobile endpoint device;
    detecting, by the processor, that a software application to interact with the remote device is not available on the mobile endpoint device;
    receiving, by the processor, an offer from the remote device to download the software application to interact with the remote device;
    downloading, by the processor, the software application to interact with the remote device;
    setting, by the processor, the language of the remote device by sending the language setting of the mobile endpoint device to the remote device using the connectivity information via the software application; and
    receiving, by the processor, an additional offer from the remote device to purchase a product or a service.

16. The method of claim 15, wherein the connectivity information comprises a uniform resource locator (URL)) for a web service hosted on the remote device.

* * * * *